United States Patent
Smith et al.

(10) Patent No.: US 12,050,763 B1
(45) Date of Patent: Jul. 30, 2024

(54) APPARATUS AND METHODS FOR MODEL SELECTION BETWEEN A FIRST MODEL AND A SECOND MODEL USING PROJECTOR INFERENCING

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/398,366

(22) Filed: Dec. 28, 2023

(51) Int. Cl.
- G06F 3/048 (2013.01)
- G06F 3/0484 (2022.01)
- G06F 18/20 (2023.01)

(52) U.S. Cl.
CPC .......... G06F 3/0484 (2013.01); G06F 18/285 (2023.01)

(58) Field of Classification Search
CPC .............................. G06F 3/0484; G06F 18/285
See application file for complete search history.

(56) References Cited

U.S. PATENT DOCUMENTS

| | | | |
|---|---|---|---|
| 8,620,716 B2 | 12/2013 | Nicholls | |
| 11,663,668 B1 * | 5/2023 | Bloom | G06Q 40/06 705/36 R |
| 11,829,895 B2 * | 11/2023 | Neumann | G06N 5/04 |
| 2016/0342922 A1 | 11/2016 | Mccarthy | |
| 2019/0180358 A1 * | 6/2019 | Nandan | G06F 18/2113 |
| 2022/0292525 A1 * | 9/2022 | Ash | G06Q 10/06315 |
| 2023/0386666 A1 * | 11/2023 | Neumann | G16H 40/67 |

FOREIGN PATENT DOCUMENTS

JP 2010134840 A 6/2010

* cited by examiner

Primary Examiner — Linh K Pham
(74) Attorney, Agent, or Firm — Caldwell Intellectual Property Law

(57) ABSTRACT

An apparatus for model selection between a first model and a second model using projector inferencing is provided. The apparatus includes a processor and a memory connected to the processor. The memory contains instructions configuring the processor to receive an entity datum from an entity device and a second datum from a client device connected to the processor. The second datum describes matching the entity datum based on a preferred allocation with target values using the models. The processor may run two projectors capable of outputting operational values by projecting the entity datum over a defined duration. The processor may score operational values to target values using a fuzzy inferencing system. Scoring the operational values may include classifying an operational value and the second datum to categories organized sequentially in multiple discrete increments.

20 Claims, 10 Drawing Sheets

APPARATUS AND METHODS FOR MODEL SELECTION BETWEEN A FIRST MODEL AND A SECOND MODEL USING PROJECTOR INFERENCING

FIELD OF THE INVENTION

The present invention generally relates to the field of artificial intelligence. More specifically, the present invention is directed to an apparatus and methods for model selection between a first model and a second model using projector inferencing.

BACKGROUND

Recent increases in computational efficiency have enabled iterative analysis of data describing complex phenomena; however, such data are only valuable inasmuch they accurately represent the complex phenomena in question and may fail for lack of systems to correctly identify a degree of inaccuracy in the iterative analysis itself. Prior programmatic attempts to resolve these and other related issues have suffered from inadequate user-provided data intake and subsequent processing capabilities.

SUMMARY OF THE DISCLOSURE

In an aspect, an apparatus for model selection between a first model and a second model using projector inferencing is provided. The apparatus includes a processor and a memory connected to the processor. The memory contains instructions configuring the a processor to receive a first datum from a first device, where the first datum describes data elements relating to actions over a defined duration and a first target value, and to receive a second datum from a client device connected to the processor, where the second datum describes matching the first datum based on the first target value using the first model or a second target value using the second model. In addition, the processor may run two projectors including a first projector and a second projector, where running two or more projectors includes outputting a first operational value by projecting the first datum over the defined duration by the first projector and outputting a second operational value by projecting the second datum over the defined duration by the second projector. Each the first operational value and the second operational value have an associated variance of noise describing projection uncertainty. In addition, the processor may score an instance of the first operational value relative to the first target value, where scoring the first operational value includes classifying the first operational value and the second datum to a label of a plurality of labels and scoring the first operational value as a function of the classifying. Further, the processor may generate an interface data structure including an input field based on the scoring, where the interface data structure configures a remote display device to display the input field to a user, receive a user-input datum into the input field, where the user-input datum describes data for updating the plurality of data elements and selecting between matching the first datum to either the first target value or the second target value, and display either the first model or the second model based on the user-input datum.

In another aspect, a method for model selection between a first model and a second model using projector inferencing is provided. The method includes receiving, by a computing device, a first entity datum from a first device, where the first datum describes a plurality of data elements relating to actions over a defined duration and a first target value, and receiving, by the computing device, a second datum from a client device connected to the computing device, where the second datum describes matching the first datum based on the first target value using the first model or a second target value using the second model. The model includes running, by the computing device, a plurality of projectors including a first projector and a second projector, where running the plurality of projectors includes outputting, by the computing device, a first operational value by projecting the entity datum over the defined duration by the first projector, and outputting, by the computing device, a second operational value by projecting the second datum over the defined duration by the second projector, where each the first operational value and the second operational value have an associated variance of noise describing projection uncertainty. The model includes scoring, by the computing device, an instance of the first operational value relative to the first target value, where scoring the first operational value includes classifying, by the computing device, the first operational value and the second datum to a label of a plurality of labels; and scoring the first operational value relative to the first target value as a function of the label. Further, the model includes generating, by the computing device, an interface data structure including an input field based on the scoring, where the interface data structure configures a remote display device to display the input field to a user, receive a user-input datum into the input field, where the user-input datum describes data for updating the plurality of data elements and selecting between matching the first datum to either the first target value or the second target value, and display either the first model or the second model based on the user-input datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for model selection between a first model and a second model using projector inferencing, which is a type of decision theoretic Bayesian approach that decouples model estimation from decision making.

Figure 1:
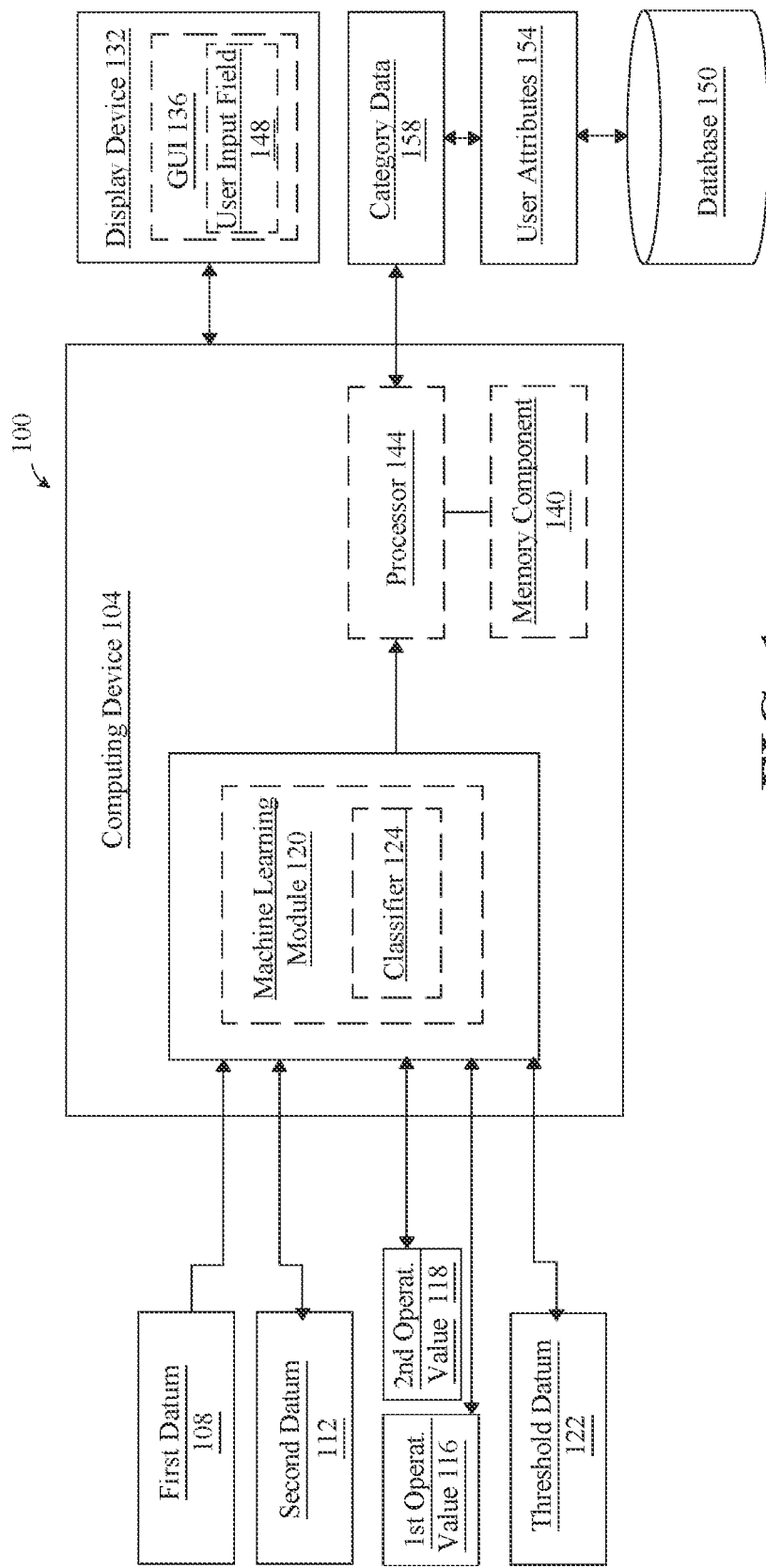
FIG. 1 is a block diagram of an embodiment of an apparatus for model selection between a first model and a second model using projector inferencing.

Referring now to FIG. 1, described processes are executed by computing device 104 including processor 144, which is configured to execute any one or more of the described steps. Memory component 140 is connected to processor 144 and contains instructions configuring processor 144 to receive first datum 108 from an entity device (not shown in FIG. 1). First datum 108 describes data elements relating to actions over a defined duration and a first target value (e.g., which may be representative of a set of choices relating to a selection of a preferred allocation between a more-preferred allocation and a less-preferred allocation of the data elements). In addition, processor 144 receives second datum 112 from a client device connected to processor 144. Second datum 112 describes matching first datum 108 based on a first target value using the first model or a second target value using the second model.

In addition, memory component 140 contains instructions configuring processor 144 to use "projector inferencing," which, as used in this disclosure, may be or include a decision theoretic Bayesian approach that decouples model estimation from decision making. Given a reference model previously built including all variables present in the data, projection predictive inferencing (also referred to herein as "projector inferencing") may project its posterior (e.g., a conditional probability conditioned on randomly observed data) onto a constrained space of a subset of variables. Variable selection is then performed by sequentially adding relevant variables until predictive performance is satisfactory.

With continued reference to FIG. 1, memory component 140 may include instructions configuring processor 144 to use a metamodel. A metamodel, as used herein, is a set of concepts that describe elements, relationships and rules governing a specific machine learning model. In an embodiment, a metamodel may be a machine-learning model of another machine-learning model. Metamodels may include any machine-learning model algorithm described in this disclosure. Examples of machine-learning algorithms may include decision trees, neural networks, Bayesian networks, genetic algorithms, support vector machines (SVM), reinforcement learning, and the like. Machine learning models are described in more detail in reference to FIG. 4.

In some embodiments, the above-described projector inferencing is instantiated computationally by being executed or run by classifier 124 within machine learning module 120 of computing device 104 of FIG. 1. That is, classifier 124 may use projector inferencing to compare two or more computational models, such as the first model and the second model as described earlier. A "projector," as used herein and in the field of data science, refers to a computer module configured to perform "data projection," which is a type of challenge encountered in machine learning and pattern recognition and derives from "dimensionality reduction," which is defined as projecting high dimensional data into low space so that the result performs better in future processing. These approaches of feature extraction, which select linear combinations of original dimensions of data using techniques such as principal component analysis (PCA), can be assumed as special cases of data projection.

Accordingly, "projectors" using "projector inferencing" can, in some embodiments, replicate human-like reasoning or inferencing in artificial intelligence applications and provide a key mechanism to solve problems of applying knowledge to varied or challenging situations, across a range of AI domains, such as vision, robotics, language, or performance improvements across a variety of contexts, such as interpersonal relationships, business planning and expansion, and other strategic initiatives including increasing athletic performance and so on. "Projection" can play a role in types of computational reasoning that may more closely resemble human abilities and, as a result, also carry additional implications for such representation. In detail, "projection" can be a top-down process "projecting" digital conceptual knowledge onto lower-level data, and thereby searching through alternative ways to represent that lower-level data. This can require human-like compositional models of concepts, and iterative inference algorithms to find a good mapping or interpretation from data to model.

"Projection," when completed by the human mind, in the context of recognizing a picture such as a face structure (at a higher layer of description) can be described in terms of spatial relations among the components eye, nose, mouth, brow (at a lower layer). Notably, projection can assign meaning to an ambiguous piece of data by leveraging higher level prior knowledge and other available data. The projection mechanism is a top-down process where a set of elements at a lower layer are grouped and interpreted as corresponding to constituent components of a higher layer. For example, in visual perception of a human face in noisy or poorly lit conditions, every low-level element might not be clearly recognizable and identifiable on its own. When ambiguous perceived elements, e.g., arising from the mouth, are given the interpretation 'mouth' partly by virtue of its relationship to other face elements, this is a result of projection. In general, projection works with hierarchical compositional knowledge structures where higher layers (e.g., face) describe relationships among components in lower layers (e.g., eye, nose, and mouth). Projection helps to create a mapping between elements sensed from real-world data (e.g., parts of the mouth), and the components in an abstract knowledge structure (e.g., symbol for mouth), where that structure defines the allowed relationships among components. In perception projection works together (interactively) with bottom-up processes, to recognize objects, words, or events. Id.

In addition, projection allows for creativity through the novel application of a concept from one domain to a different domain, or through facilitating a different perspective using concepts within a domain. In the example of a human facial structure recognized on the side of a cliff, one may be conscious of a projection mechanism at work, e.g., on seeing eyes and nose, one may search for something like a mouth in the appropriate location. These difficult conditions merely make the viewer more conscious of the projection process. In everyday cognition projection happens subconsciously. Projection must be happening all the time in human perception because typical viewing conditions are difficult, due to the many 'defects' in the human visual apparatus, especially in the periphery of vision. For example, blood vessels and nerve axons obscure significant areas of the retina, and there is sparsity and nonuniformity in the distribution of cones. Id.

Further, projection may assist in the recognition of concepts in difficult conditions. In a relatively more advanced human perception example involving an image, two paper clips may be oriented to resemble two humans sitting adjacent to one another on a ledge, where one paper clip appears to be consoling the other paper clip. Each paper clip maintains a natural human posture. Accordingly, this relatively more advanced example of projection goes beyond purely visual concepts as it involves affective states and social interaction. Understanding this image may require an iterative inference where bottom-up vision detects general form, triggering the possibility that this represents the human form, where this in turn triggers a projection to imagine the human form in a matching pose, leading to the recognition of the affective states and the social interaction. The artist who originally created the idea of this composition performed an analogy where the relationship among parts in the human domain is projected onto the available objects and parts in the safety-pin domain. The higher-level relations in the human domain (e.g., bending of the head or arm) organize lower-level components in the safety-pin domain to form the same relationship. There is no actual arm in the safety-pin, but when the relations from the human domain are imposed on the parts of a safety-pin then, it is possible for humans to recognize the part in the appropriate relationship as an 'arm.' To perform human-like projection in machines, such machines will need to have human-like part-based compositional models of concepts. Id.

Still further, projection may be used in planning activities. For example, a type of thinking involved in planning physical manipulation activities, such as rearranging objects in a kitchen cupboard, may be one such type of planning activity. There will be a main goal state, involving desired positions of main objects, and a series of steps will be planned. At each stage, there are several potential candidate sub-activities to consider, such as temporarily placing one item on others, or pushing one item aside. In each of these sub activities projection is employed, e.g., to make the judgment about whether an object can support another, or if the upper one will roll or fall off. The objects in question must be modelled by some mental representations, e.g., of exemplar concepts (cylinder, flexible bag, etc.). Objects are approximated by mental representations, and this is a process of projection that imposes some model on an object. Projection is also used in the selection of manipulation actions to employ given a need in a step (e.g., to open a gap between objects for inserting another) the current situation can be matched to similar remembered situations where a similar problem was solved. Projection is used to match a stored model of a remembered situation to the current situation. Projection can again be employed to foresee the consequences of steps: remembered episodes (including effects) can be projected onto the current situation describe how analogy can be employed to find similar remembered behaviors, and to use these for mental simulation. In this way projection is a component mechanism that works as part of a larger machinery of cognition, to complete physical cognition tasks. Id.

In the above-described examples, the bottom-up data in the lower layer may be considered to be ambiguous, such that projection will assign an interpretation to a set of lower layer elements, which supports the recognition of the higher layer concept should sufficient evidence deemed to be present. Id.

In contrast to the above-described examples relating to usage of projections in human cognitive processes, projection can also be implemented in computers, such as computing device 104 of apparatus 100 of FIG. 1. Generally, projection can be implemented in various ways in computing environments. In some examples, a model, e.g., machine learning module 120, may be the main data structure employed, and structured hierarchically, with a minimum of two levels, the higher levels describe relations among lower-level elements, as in 'face' describing relation among 'mouth,' 'eyes,' etc., in the previous section. Multiple models may be stored in long-term memory, e.g., memory component 140, and selected as candidates for interpreting data. One skilled in the art will recognize that various selection processes may be suitable. Here, task context-based selection, or other contextual factors making a particular interpretation may be used. Selected models may become instantiated in a workspace for the reasoning process. This may involve an interaction of top-down and bottom-up processes for determining how well a particular model could fit the data. Id.

The assignment of elements of a model to elements of data may be referred to as "a mapping" or "interpretation." There may be several instances of the same model mapping to data in different ways, e.g., seeing a face in rock with different mappings to elements. The reasoning process also coordinates across the various mapping attempts by seeking the best set of mappings that could coherently explain the data (such as, 'explaining away'), or enforcing a mapping that satisfies some other goal or external pressure, e.g., if in manipulation we want to see a particular affordance, or if we are asked to apply a particular model. A benefit projection as described above (disambiguating data) can be explained in other words as follows: projection is when a low-level element of data could equally well be interpreted as an "x" or a "y" based on the local data. But it can be interpreted as "y," as that may assist in providing consistent evidence for the recognition of a higher-level concept, with "y" as a constituent part. This type of interpretation on data can be referred to as "projecting." Id.

Computationally, as may be executed by classifier 124 of machine learning module 120 of computing device 104 of FIG. 1, a model M (corresponding to a concept) may be an n-tuple of levels $(l_1, l_2 \ldots l_n)$ where each $l_i$ is an m-tuple $(e_1, e_2 \ldots e_m)$ of elements $e_j$. In level $l_0$ elements are empty slots in the abstract model and will be filled with data during interpretation. For levels i>1 each element in level $l_i$ needs to describe a relation among some elements in level $l_{i-1}$, this may be achieved by each element $e_j$ being a pair $(p, f)$ where p is a tuple of specific 'parts', e.g., elements from the lower level, and $f$ is a scoring function mapping parts p to a real value. The scoring function $f$ may assign a value top according to how well it captures the intended relation among parts. Since each part can itself be composed of subparts all the way down to the lowest level, the function $f$ has access to the full information of the hierarchy of parts below it. Level $l_n$ (top of hierarchy) always has only one element, ensuring that there can be a single overall score for an interpretation by a model. Id.

D is a set of data points (which could be, e.g., (x, y, color) values of pixels). An interpretation or mapping of D by model M is a binary relation over D and $l_1$ where elements of $l_1$ are each related to at most one (not necessarily unique) element of D. Some elements of D and $l_1$ may be unmapped (corresponding to, e.g., missing, irrelevant or unclear data). If we populate $l_1$ with the data elements mapped by the interpretation, then we can apply the scoring function of $l_n$, and determine how good the interpretation is. Finding a usable interpretation can be referred to as "inference" or "reasoning" and can be relatively complex compared to other calculative processes. A simple way is to run the $f$ functions of level $l_2$ over multiple subsets of D to find good candidates for $l_2$ elements, then run $l_3$'s $f$ functions over these candidates to find good candidates for $l_4$, etc. This is roughly how current feedforward networks work. This may however miss out on a good interpretation because the lower-level scoring functions may lack information about what is needed at the top level; it may be that some data points that produce a poor score for a certain $l_2$ element should nevertheless be used because the overall model fit will be good. Therefore, a superior inference strategy uses top-down information to guide the selection of parts in the lower levels. We call any interpretation using top-down information 'projection'; i.e., where the $f$ functions from a level higher than $l_i$ contribute to the decision about what elements from $l_{i-1}$ to use.

The processor runs two projectors including a first projector and a second projector. Running two or more projectors uses projector inferencing and includes outputting a first operational value by projecting the first datum over the defined duration by the first projector and outputting a second operational value by projecting the second datum over the defined duration by the second projector. Each of the first operational value and the second operational value have an associated variance of noise describing projection uncertainty. The processor scores an instance of the first operational value relative to the first target value. In some embodiments, scoring includes using a fuzzy inferencing system to impose rules that account for projections output by the two re projectors. Scoring an instance of the first operational value includes classifying an instance of the first operational value and the second datum to categories organized sequentially in multiple discrete increments defined based on a proximity of a respective label to the first target value. In some embodiments, scoring may include directing a fraction of the data elements to the entity device based on a preferred allocation and classification. The fraction is constrained to exceeding a pre-defined threshold value resulting in over-depletion of data elements from the less-preferred allocation. In addition, the processor may generate an interface data structure including an input field based on ranking an instance of the first datum based on classification.

In addition, the memory contains instructions configuring a processor to generate an interface data structure including an input field based on ranking the first transfer datum and the second transfer datum. An "interface data structure," as used in this disclosure, is a data structure used to "," such as by digitally requesting, for data results from a database and/or for action on the data. "Data structure," in the field of computer science, is a data organization, management, and storage format that is usually chosen for efficient access to data. A "data structure" is a collection of data values, the relationships among them, and the functions or operations that can be applied to the data. Data structures also provide a means to manage relatively large amounts of data efficiently for uses such as large databases and internet indexing services. Generally, efficient data structures are essential to designing efficient algorithms. Some formal design methods and programming languages emphasize data structures, rather than algorithms, as an essential organizing factor in software design. In addition, data structures can be used to organize the storage and retrieval of information stored in, for example, both main memory and secondary memory.

"Interface data structure," as used herein, refers to, for example, a data organization format used to digitally request a data result or action on the data. In addition, the "interface data structure" can be displayed on a display device, such as a digital peripheral, smartphone, or other similar device, etc. The interface data structure may be generated based on received user data, where user data may include historical data of the user. Historical data may include attributes and facts about a user that are already publicly known or otherwise available, such as quarterly earnings for publicly traded businesses, or health and/or personal training specifics in the context of physical performance training, etc. In some embodiments, interface data structure prompts may be generated by a machine-learning model. As a non-limiting example, the machine-learning model may receive user data and output interface data structure questions.

In some embodiments, an interface data structure may configure a remote display device to display the input field to a user, and to receive a user-input datum into the input field. User-input datum describes data for updating the preferred allocation of the data elements and selecting between matching the first datum to either the first target value or the second target value. Accordingly, the interface data structure configures a remote display device to display either the first model or the second model based on the user-input datum.

Still referring to FIG. 1, an exemplary embodiment of apparatus 100 for model selection between a first model and a second model using projector inferencing is provided. In one or more embodiments, apparatus 100 includes computing device 104, which may include without limitation a microcontroller, microprocessor (also referred to in this disclosure as a "processor"), digital signal processor (DSP) and/or system on a chip (SoC) as described in this disclosure. Computing device 104 may include a computer system with one or more processors (e.g., CPUs), a graphics processing unit (GPU), or any combination thereof. Computing device 104 may include a memory component, such as memory component 140, which may include a memory, such as a main memory and/or a static memory, as discussed further in this disclosure below. Computing device 104 may include a display component (e.g., display device 132, which may be positioned remotely relative to computing device 104), as discussed further below in the disclosure. In one or more embodiments, computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices, as described below in further detail, via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks, as described below, across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104. In some embodiments, computing device 104 may be further configured to select between a first model and a second model using a metamodel.

With continued reference to FIG. 1, computing device 104 may be designed and/or configured to perform any method, method step, or sequence of method steps in any embodiment described in this disclosure, in any order and with any degree of repetition. For instance, computing device 104A may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to receive an element of first datum 108. First datum may include, without limitation, data describing operational conditions related to achieving an enumerated target by an entity, such as an extant business, corporation, or the like. First datum may describe various data elements (e.g., monetary, land, intellectual property, and other forms of intangible assets and the like) of the entity and, in some embodiments, a pattern that is representative of entity interaction with the user (as introduced earlier). In addition, in one or more embodiments, first datum 108 may describe data elements relating to actions over a defined duration and a first target value (e.g., which may be representative of a set of choices relating to a selection of a preferred allocation between a more-preferred allocation and a less-preferred allocation of the data elements). That is, for example, if an entity is a pre-owned luxury vehicle sales business, then data elements may include money and land. The business may choose between allocating certain land data elements to storing vehicles inside garages or outside in plain public view and may further choose between devoting portions of a limited monetary budget to marketing those vehicles, for example, stored inside garages, which may be more valuable per vehicle than those stored outside. The individual choices reflecting these, and other similar decisions, is collectively referred to as a "preferred allocation" herein, such that the entity prefers to allocate its data elements in a certain way, shape, or form, etc. In some embodiments, first datum 108 may be input into computing device 104 manually by the client, who may be associated with any type or form of establishment (e.g., a business, university, non-profit, charity, etc.), or may be an independent entity (e.g., a solo proprietor, an athlete, an artist, etc.). In some instances, first datum 108 may be extracted from a business profile, such as that may be available via the Internet on LinkedIn®, a business and employment-focused social media platform that works through websites and mobile apps owned my Microsoft® Corp., of Redmond, WA. Such a business profile may include the past achievements of a user in various fields such as business, finance, and personal, depending on one or more particular related circumstances. Persons skilled in the art, upon reviewing the entirety of this disclosure, will be aware of various other ways or situations in which first datum 108 may be input, generated, or extracted for various situations and goals. For example, in an example where the entity is a business, first datum 108 may be extracted from or otherwise be based on the entity's business profile, which may include various business records such as financial records, inventory record, sales records, and the like. In addition, in one or more embodiments, first datum 108 may be generated by evaluating interactions with external entities, such as third parties. In a business-related context, such an example external entity (or third party) may be that offered by Moody's Investors Services, Inc., Moody's Analytics, Inc. and/or their respective affiliates and licensors, of New York, NY. Services rendered may include providing international financial research on bonds issued by commercial and government entities, including ranking the creditworthiness of borrowers using a standardized ratings scale which measures expected investor loss in the event of default. In such an example, first datum 108 extracted from such an external entity may include ratings for debt securities in several bond market segments, including government, municipal and corporate bonds, as well as various managed investments such as money market funds and fixed-income funds and financial institutions including banks and non-bank finance companies and asset classes in structured finance.

In addition, or the alternative, in one or more embodiments, first datum 108 may be acquired using web trackers or data scrapers. As used herein, "web trackers" are scripts (e.g., programs or sequences of instructions that are interpreted or carried out by another program rather than by a computer) on websites designed to derive data points about user preferences and identify. In some embodiments, such web trackers may track activity of the user on the Internet. Also, as used herein, "data scrapers" are computer programs that extract data from human-readable output coming from another program. For example, data scrapers may be programmed to gather data on user from user's social media profiles, personal websites, and the like. In some embodiments, first datum 108 may be numerically quantified (e.g., by data describing discrete real integer values, such as 1, 2, 3 . . . n, where n=a user-defined or prior programmed maximum value entry, such as 10, where lower values denote lesser significance relating to favorable business operation and higher values denote greater significance relating to favorable business operation).

Other example values are possible along with other exemplary attributes and facts about an entity (e.g., a business entity) that are already known and may be tailored to a particular situation where explicit new business proposal assessment (e.g., for model selection between a first model and a second model using projector inferencing) is sought. In one or more alternative embodiments, first datum 108 may be described by data organized in or represented by lattices, grids, vectors, etc., and may be adjusted or selected as necessary to accommodate particular client-defined circumstances or any other format or structure for use as a calculative value that a person skilled in the art would recognize as suitable upon review of the entirety of this disclosure.

In one or more embodiments, first datum 108 may be provided to or received by computing device 104 using various means. In one or more embodiments, first datum 108 may be provided to computing device 104 by a business, such as by a human authorized to act on behalf of the business including any type of executive officer, an authorized data entry specialist or other type of related professional, or other authorized person or digital entity (e.g., software package communicatively coupled with a database storing relevant information) that is interested in improving and/or optimizing performance of the business overall, or in a particular area or field over a defined duration, such as a quarter or six months. In some examples, a human may manually enter first datum 108 into computing device 104 using, for example, user input field 148 of graphical user interface (GUI) 136 of display device 132. For example, and without limitation, a human may use display device 132 to navigate the GUI 136 and provide first datum 108 to computing device 104. Non-limiting exemplary input devices include keyboards, joy sticks, light pens, tracker balls, scanners, tablet, microphones, mouses, switches, buttons, sliders, touchscreens, and the like. In other embodiments, first datum 108 may be provided to computing device 104 by a database over a network from, for example, a network-based platform. First datum 108 may be stored, in one or more embodiments, in database 150 and communicated to computing device 104 upon a retrieval request from a human and/or other digital device (not shown in FIG. 1) communicatively connected with computing device 104. In other embodiments, first datum 108 may be communicated from a third-party application, such as from a third-party application on a third-party server, using a network. For example, first datum 108 may be downloaded from a hosting website for a particular area, such as a networking group for small business owners in a certain city, or for a planning group for developing new products to meet changing client expectations, or for performance improvement relating to increasing business throughput volume and profit margins for any type of business, ranging from smaller start-ups to larger organizations that are functioning enterprises. In one or more embodiments, computing device 104 may extract first datum 108 from an accumulation of information provided by database 150. For instance, and without limitation, computing device 104 may extract needed information from a database 150 or other datastore regarding assessment of a particular new business or project proposal by the entity and avoid taking any information determined to be unnecessary. This may be performed by computing device 104 using a machine-learning model, which is described in this disclosure further below.

At a high level, and as used herein, "machine-learning" describes a field of inquiry devoted to understanding and building methods that "learn"—that is, methods that leverage data to improve performance on some set of defined tasks. Machine-learning algorithms may build a machine-learning model based on sample data, known as "training data," to make predictions or decisions without being explicitly programmed to do so. Such algorithms may function by making data-driven predictions or decisions by building a mathematical model from input data. These input data used to build the machine-learning model may be divided into multiple data sets. In one or more embodiments, three data sets may be used in different stages of the creation of the machine-learning model: training, validation, and test sets.

Described machine-learning models may be initially fit on a training data set, which is a set of examples used to fit parameters. Here, example training data sets suitable for preparing and/or training described machine-learning processes may include data relating to historic business operations under historic circumstances, or circumstances in certain enumerated scenarios, such as during a period low interest rates or relatively easy bank lending, or during a period of highly restrictive fiscal policy implemented to control and address undesirably high inflation. Such training sets may be correlated to similar training sets of user attributes 154 relating to particular attributes of the user. In the described example of first datum 108 relating to a business, user attributes 154 may describe one or more elements, datum, data and/or attributes relating to client or customer engagement with services provided by the entity. For example, a business may require financing to launch and can approach a bank (e.g., a type of entity) for one or more types of loans. In this example, user attributes 154 may describe or relate to data describing retail, regional, or even investment banks. In addition, user attributes may include data describing liquidity available to customers (e.g., clients) and performance of outstanding loans and other products. In addition, first datum 108 may include data describing a pattern of activity or conduct undertaken by the client regarding acquisition of goods or services from the user, depending on, for example, repayment behavior of the client to the user for services rendered by the user to the client. In banking, that may mean that the client will assess risk in relatively difficult macroeconomic conditions as dictated by higher-than-average federal interest rates, etc.

In addition, in one or more embodiments, computing device 104 is configured to receive an element of second datum 112. For the purpose of this disclosure, a "second datum" is an element, datum, or elements of data describing services provider by a second, such as a business development or marketing coach, intending to increase one or more specific aspects of the entity as reflected by entity datum (e.g., for services the entity rendered to a customer, etc.). In addition, second datum 112 may describe second information, work habits, skill, client relationships, and the like, such as evaluating any new business or project proposal to determine whether it can fall into a label included in profitability packager database 300. That is, processor 144 may receive second datum 112 from a client device (such as a computing device or smartphone, etc., not shown in FIG. 1) connected to processor 144. Second datum 112 may describe matching first datum 108 based on a preferred allocation, as described above, with a first target value (e.g., as an initial sales target after 3 months) using the first model (which may involve, for example, using a performance improvement plan, etc.) or a second target value (e.g., as an initial sales target after 6 months) using the second model (which may involve more dedicated measures, such as hiring and retaining an outside business consultancy firm to optimize operational integrity, etc.).

In addition, in one or more embodiments, processor 144 of computing device 104 is configured to use projection inferencing as described above and run two projectors including a first projector and a second projector. Running two or more projectors includes outputting first operational value 116 by projecting first datum 108 over a defined duration (e.g., 3 months, 6 months, etc.) by the first projector and outputting second operational value 118 by projecting second datum 112 over the defined duration by the second projector, where each first operational value 116 and second operational value 118 have may an associated "variance of noise" describing projection uncertainty. "Variance of noise," as used herein, is the "variance," or fluctuation of learned functions given different datasets, of "noise," which is the irreducible error due to non-deterministic outputs of the ground truth function itself. Such data projections generated by projection inferencing may produce data, such as in the form of first operational value 116 or second operational value 118, that describes entity performance at the end of the defined duration. That is, in the example of the used luxury vehicle dealership introduced earlier, the dealer (e.g., the entity), may have first operational value 116 represent luxury vehicle sales using internal marketing data elements only, which may amount to 15 vehicles sold. However, while using or otherwise engaging with an outside business consultancy firm (e.g., the second), the pre-owned luxury vehicle dealership may see sales volume increase to 30 vehicles sold during the same time period. Those skilled in the art will appreciate that these figures are provided by way of example only, and that projection inferencing as used herein may extend to or include projections relating to other forms of business performance data, such as employee or contractor retention, identification of suitable divestitures or acquisitions, or the like.

Accordingly, processor 144 may (e.g., numerically) score an instance of first operational value 116 relative to a first target value (e.g., sales at the end of the defined duration) by using a fuzzy inferencing system (described further herein in FIG. 5) to impose rules that account for projections output by the two or more projectors. Scoring an instance of the first operational value includes classifying (as described below) an instance of first operational value 116 and the second datum to categories organized sequentially in multiple discrete increments defined based on a proximity of a respective label to the first target value, such as where the entity desired to be at the end of the duration in terms of performance.

In one embodiment, example categories may include the following, listed in order from least feasible to most feasible: (1) plausible; (2) possible; (3) provable; (4) permissible; (5) protectable; (6) priceable; (7) packageable; (8) producible; (9) preferable; and (10) palpable. Further, in one or more embodiments, each label may require a minimum cut-off score required for entry. That is, the following scoring scheme may be applied: (1) plausible—1; (2) possible—4; (3) provable—9; (4) permissible—16; (5) protectable—25; (6) priceable—36; (7) packageable—49; (8) producible—64; (9) preferable—81; and, (10) palpable—100. In addition, each label may correspond to data describing certain enumerated operational conditions, such as the following: (1) plausible—"you see it's intriguing, worth a try", (2) possible—"committed and courageous, you're starting the work"; (3) provable—"you have a clear-cut, objective evidence that it's a breakthrough"; (4) permissible—"regarding all regulations that control its future, the new capability is OK"; (5) protectable—"this capability breaks new ground in new ways, and its 100% your legal property or right, etc." (6) priceable—"tested against the toughest demands of the best users—they win, you win"; (7) packageable—"everything has come together into an attractive, easy-to-understand format and form"; (8) producible—"it's packaged, it's convenient, and it's widely available; confident that supply can meet growing demand"; (9) preferable—"compared to other solutions, this is clearly superior, great authoritative testimonials"; and (10) palpable—"it's a hot item; everybody who matters wants it; price is a minor issue; would-be competitors don't know how."

Returning to the example of the premium pre-owned vehicle dealership, self-directed marketing (e.g., the first model), may yield a score of "4" regarding usage of the first model (e.g., internal marketing), corresponding to (2) possible—"committed and courageous, you're starting the work." In contrast, hiring the outside business consulting firm may yield a score of 81, corresponding to (9) preferable—"compared to other solutions, this is clearly superior, great authoritative testimonials." Those skilled in the art will appreciate that other combinations, scenarios, and outcomes are possible under the described processes.

Accordingly, processor 144 may direct a fraction of data elements to an entity device (e.g., representing the entity) based on a preferred allocation and classification. In one or more embodiments, the fraction is prohibited from exceeding a pre-defined threshold value (e.g., represented by threshold datum 122) resulting in over-depletion of data elements from the less-preferred allocation. That is, in the example of the pre-owned luxury car dealership, threshold datum 122 may require retention of 30% of the dealership's monthly operational budget as an emergency fund in the event of potential inventory supply issues and the like. Therefore, the dealership may be prohibited, as indicated by threshold datum 122, from spending more than 70% of its monthly budget on either the first model (e.g., internal marketing), or the second model (e.g., hiring an outside business consultancy service).

Further, processor 144 may generate an interface data structure including input field 148 based on ranking the instance of first datum 108 based on classification. The interface data structure configures a remote display device to display input field 148 to a user and receive user-input datum 224 of FIG. 2A into input field 148. User-input datum 224A describes data for updating the preferred allocation of the data elements and selecting between matching first datum 108 to either the first target value or the second target value and to display either the first model or the second model based on the user-input datum. That is, in the luxury pre-owned vehicle dealership example, should user-input datum 224 indicate a preference of allocating all available data elements (e.g., 70%) toward hiring an outside business consultancy, then the second model may be displayed in display model field 224B.

In addition, described concepts relating to projections, scoring, classification, or other data manipulative techniques that can be quantified by one or more elements, datum or data may thereby be processed by "machine-learning processes" executed by machine-learning module 120 of computing device 104. A "machine-learning process," as used in this disclosure, is a process that automatedly uses training data to generate an algorithm that will be performed by a computing device/module (e.g., computing device 104 of FIG. 1) to produce outputs given data provided as inputs. Any machine-learning process described in this disclosure may be executed by machine-learning module 120 of computing device 104 to manipulate and/or process first operational value 116 relating to describing instances or characteristics of confidence for the user.

"Training data," as used herein, is data containing correlations that a machine-learning process may use to model relationships between two or more categories of data elements. For instance, and without limitation, training data, in this instance, may include multiple data entries, each entry representing a set of data elements that were recorded, received, and/or generated together and described various confidence levels or traits relating to demonstrations of confidence. Data elements may be correlated by shared existence in a given data entry, by proximity in a given data entry, or the like. Multiple categories of data elements may be related in training data according to various correlations, which may indicate causative and/or predictive links between categories of data elements, which may be modeled as relationships such as mathematical relationships by machine-learning processes as described in further detail below. In addition, training data may be formatted and/or organized by categories of data elements, for instance by associating data elements with one or more descriptors corresponding to categories of data elements.

For instance, a supervised learning algorithm (or any other machine-learning algorithm described herein) may include one or more instances of first operational value 116 describing confidence of a user as described above as inputs. Accordingly, computing device 104 of FIG. 1 may receive user-input datum 224A into input field 148 of display device 132. User-input datum 224A may describe data for updating the preferred allocation of the plurality of data elements and selecting between matching first datum 108 to either the first target value or the second target value. Classifier 124 of machine-learning module 120 may classify one or more instances of first operational value 116 relative to, for example, second operational value 118. Accordingly, in some embodiments, classifier 124 may classify instances of first operational value 116 that more closely relate to or resemble second operational value 118 within a closer proximity to second operational value 118.

Still referring to FIG. 1, in one or more embodiments, using projector inferencing as described above includes retrieving data describing user attributes 154 of the user from database 150 communicatively connected to the processor and generating the interface data structure based on the data describing user attributes 154. In addition, in some embodiments, using projector inferencing may include retrieving data describing current preferences of the client device (e.g., of the second) between a minimum value and a maximum value from a database communicatively connected to the processor; and generating the interface data structure based on the data describing current preferences of the client device. Still further, using projector inferencing may include classifying an instance of first datum 108 and second datum to the first target value, ranking at the an instance of the entity datum and the second datum based on a respective proximity to the first target value, and adjusting a threshold datum for triggering resource transfer from the client device to the entity device based on the ranking of an instance of first datum 108 and second datum 112.

In addition, in some embodiments, first datum 108 may describe data elements of an entity device and a pattern that is representative of entity interactions with a user. Accordingly, using projector inferencing may include determining threshold datum 122 by classifying the pattern that is representative of entity interaction with the user to second datum 112. Further, in some embodiments, using projector inferencing includes adjusting the pattern that is representative of entity interaction with the user based on threshold datum 122. In addition, using projector inferencing may include classifying the entity datum to one or more categories based on the pattern that is representative of entity interaction with a user.

Still further, in one or more embodiments, processor 144 may be configured to evaluate user-input datum 224A by classifying one or more new instances of user-input datum 224A to first datum 108 and second datum 112 and generating a gap datum (not shown in FIG. 1) based on the classification by subtracting a respective first datum 108 from the first target value and displaying one or more instances of the gap datum in an ordered listing. In addition, in some embodiments, classifying an instance of first datum 108 and second datum 112 to categories may include aggregating first datum 108 based on the classification; and further classifying aggregated entity data to data describing a pattern that is representative of entity interaction with the user. In addition, in some embodiments, the interface data structure may configure the remote display device to provide an articulated graphical display including multiple regions organized in a tree structure format. Each region may provide one or more instances of points of interaction between the user and the remote display device.

In some instances, in one or more embodiments, computing device 104 is configured to receive an element of second operational value 118. In addition, or the alternative, computing device 104 is configured to receive one or more instances of an "outlier cluster," as used for methods described in U.S. patent application Ser. No. 18/141,320, filed on Apr. 28, 2023, titled "METHOD AND AN APPARATUS FOR ROUTINE IMPROVEMENT FOR AN ENTITY," and, U.S. patent application Ser. No. 18/141,296, filed on Apr. 28, 2023, titled "SYSTEMS AND METHODS FOR DATA STRUCTURE GENERATION," both of which are incorporated herein by reference herein in their respective entireties. As described earlier and throughout this disclosure, a "target datum" is an element, datum, or elements of data describing a payment or repayment goal or objective, either short or long term, desired for achievement by the user. Accordingly, in this example, second operational value 118 may be determined or identified using one or more outlier clusters. Described machine-learning processes may use, as inputs, one or more instances of first datum 108, second datum 112, first operational value 116, second operational value 118 and/or threshold datum 122 in combination with the other data described herein and use one or more associated outlier cluster elements with target outputs, such as display model field 224B. As a result, in some instances, classifier 124 may classify inputs to target outputs including associated outlier cluster elements to generate display model field 224B.

In addition, and without limitation, in some cases, database 150 may be local to computing device 104. In another example, and without limitation, database 150 may be remote to computing device 104 and communicative with computing device 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104 connects directly, dynamically, and non-hierarchically to as many other computing devices as possible. A "network topology" as used in this disclosure is an arrangement of elements of a communication network. Network may use an immutable sequential listing to securely store database 150. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Database 150 may include keywords. As used in this disclosure, a "keyword" is an element of word or syntax used to identify and/or match elements to each other. For example, without limitation, a keyword may be "finance" in the instance that a business is seeking to optimize operations in the financial services and/or retirement industry. In another non-limiting example, keywords of a key-phrase may be "luxury vehicle manufacturing" in an example where the business is seeking to optimize market share internationally, or certain rapidly developing markets. Database 150 may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 1, a "classifier," as used in this disclosure is type or operational sub-unit of any described machine-learning model or process executed by machine-learning module 120, such as a mathematical model, neural net, or program generated by a machine-learning algorithm known as a "classification algorithm" that distributes inputs into categories or bins of data, outputting the categories or bins of data and/or labels associated therewith. A classifier may be configured to classify and/or output a datum (e.g., one or more instances of any one or more of first datum 108, second datum 112, first operational value 116, and/or second operational value 118 as well as other elements of data produced, stored, categorized, aggregated or otherwise manipulated by the described processes) that labels or otherwise identifies a set of data that are clustered together, found to be close under a distance metric, or the like.

Referring again to FIG. 1, computing device 104 may be configured to identifying business impact by using classifier 124 to classify one or more instances of any one or more of first datum 108, second datum 112, first operational value 116, and/or second operational value 118 based on user attributes 154 and/or label data 158. Accordingly, classifier 124 of machine-learning module 120 may classify attributes within user attributes 154 related to demonstrating one or more repayment behaviors toward reaching or exceeding second operational value 118.

In addition, in some embodiments, machine-learning module 120 performing the described correlations may be supervised. Alternatively, in other embodiments, machine-learning module 120 performing the described correlations may be unsupervised. In addition, classifier 124 may label various data (e.g., one or more instances of any one or more of first datum 108, second datum 112, first operational value 116, and/or second operational value 118 as well as other elements of data produced, stored, categorized, aggregated, or otherwise manipulated by the described processes) using machine-learning module 120. For example, machine-learning module 120 may label certain relevant parameters of one or more instances of first datum 108 with parameters of one or more user attributes 154.

In addition, machine-learning processes performed by machine-learning module 120 may be trained using one or more instances of label data 158 to, for example, more heavily weigh or consider instances of label data 158 deemed to be more relevant to the business. More specifically, in one or more embodiments, label data 158 may be based on or include correlations of parameters associated with first datum 108 to parameters of user attributes 154. In addition, label data 158 may be partially based on earlier iterations of machine-learning processes executed by machine-learning module 120. In some instances, running machine-learning module 120 over multiple iterations refines correlation of parameters or data describing actions (e.g., associated with first datum 108) with parameters describing user attributes 154.

Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is two values. Each value of n-tuple of values may represent a measurement or other quantitative value associated with a given label of data, or attribute, examples of which are provided in further detail below; a vector may be represented, without limitation, in n-dimensional space using an axis per label of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figures 2A, 2B:
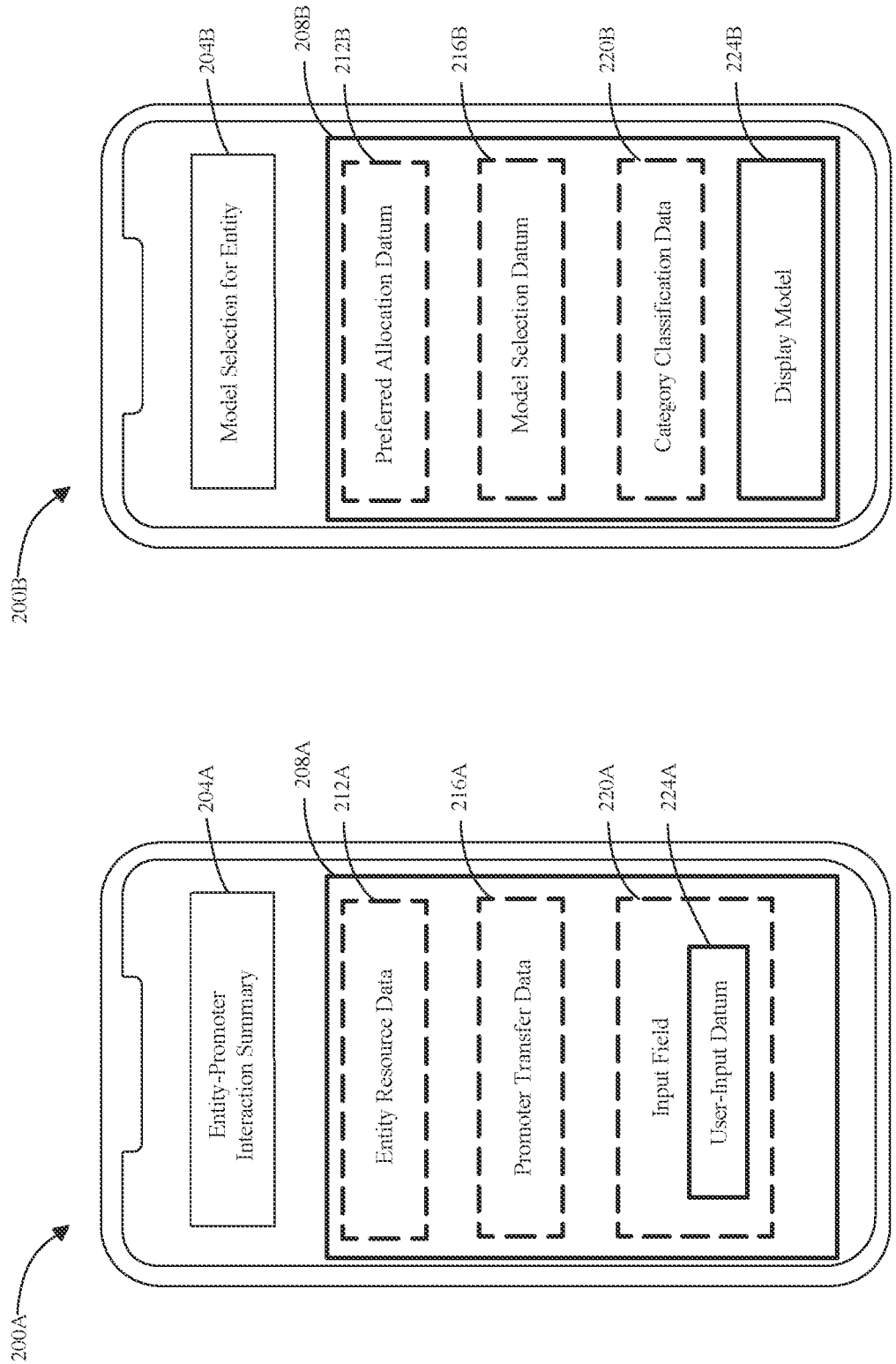
FIGS. 2A-2B are diagrammatic representations of multiple exemplary embodiments of output generated by an interface data structure.

Referring now to FIGS. 2A-2B, exemplary embodiments of user input field 148 as configured to be displayed by GUI 136 of display device 132 based on an interface data structure are illustrated. As defined earlier, an "interface data structure" refers to, for example, a data organization format used to digitally request a data result or action on the data (e.g., stored in a database). In one or more embodiments, each output screen 200A-200B may be an example of an output screen configured to be displayed by display device 132 of FIG. 1 by the described interface data structure. That is, the described interface data structure may configure display device 132 of FIG. 1 to display any one or more of output screens 200A-200B as described in the present disclosure. Accordingly, output screen 200A may include multiple forms of indicia.

In one or more embodiments, output screen 200A and output screen 200B may be examples of user input field 148 and/or GUI 136 as displayed by display device 132, which may be a "smart" phone, such as an iPhone, or other electronic peripheral or interactive cell phone, tablet, etc. Output screen 200A may be a screen initially displayed to a user (e.g., a human or a human representing or acting on behalf of a business or some other entity, and have user engagement area 208A including identification field 204A, entity resource data field 212A, second transfer field 216A, user-input field 220A, which may include one or more instances of user-input datum 224A describing data for selecting a preferred attribute of any one or more repayment behaviors associated with one or more instances of first datum 108.

In addition, in one or more embodiments, user-input datum 224A may be reflective of and/or provide a basis for user attributes 154. Persons skilled in the art, upon reviewing the entirety of this disclosure, will be aware of various ways in which fewer or additional interactive user input fields may be displayed by user engagement area 208A. Identification field 204A may identify described processes performed by processor 144 of computing device 104 by displaying identifying indicia, such as "Entity-Promoter Interactions Summary" as shown in FIG. 2A to permit, for example, a human to interact with GUI 136 and input information relating to a field of choice (e.g., business operations), through (for example) interactivity provided by identification field 204A.

Such information can include data describing activities performed by the business relating to the business achieving its defined goal (e.g., second operational value 118 of FIG. 1). In some instances, a human may select from one or more options (not shown in FIG. 2A) relating to prompts provided by identification field 204A to input such information relating to specific details of, for example, the business. In addition, in some embodiments, any of the described fields may include interactive features, such as prompts, permitting for a human to select additional textual and/or other digital media options further identifying or clarifying the nature of the business relating to the respective specifics of that field. For example, entity resource data field 212A may display assessments of corresponding instruction sets regarding relevance and potential for positive impact on the business and may thereby also provide interactive features permitting the human to input additional data or information relating to expectations of positive of negative assessments for a given instruction set. Such additional human-input data may be computationally evaluated by described machine-learning processes executed by machine-learning module 120 and thereby correspondingly appear in the described progression sequence.

Like output screen 200A, output screen 200B may be an example of a screen subsequently shown to a human as described earlier based on human-provided input to any one or more of the displayed fields. That is, output screen 200B may display "Model Selection for Entity" in identification field 204B as indicating completion of intake of human-provided input and that described machine-learning processes have completed described classifying processes to output projector inferencing data display area 208B to the user. For example, in one or more embodiments, projector inferencing data display area 208B may also include multiple human-interactive fields, including preferred allocation datum field 212B, model selection datum field 216B, label classification data field 220B, and display model field 224B generated as described earlier.

Persons skilled in the art, upon reviewing the entirety of this disclosure, will be aware of various ways in which fewer or additional interactive human input fields may be displayed by output screen 200B. Each field within projector inferencing data display area 208B may display any combination of human interactive text and/or digital media, each field intending to provide specific data-driven feedback directed to optimizing ongoing business performance of the business. Various example types of specifics (e.g., "decrease risky leverage in high interest rate conditions") are shown in projector inferencing data display area 208B, but persons skilled in the art will be aware of other example types of feedback, each of which being generated as suitable for a given business by processor 144. In addition, in one or more embodiments, any one or more fields of projector inferencing data display area 208B may be human-interactive, such as by posing a for the human to provide feedback in the form of input such that described machine-learning processes performed by machine-learning module 120 may intake refined input data and correspondingly process related data and provide an updated projector inferencing data display area 208B. In some embodiments, such processes may be performed iteratively, thereby allowing for ongoing refinement, redirection, and optimization of projector inferencing data display area 208B to better meet the needs of the client or user.

Figure 3:
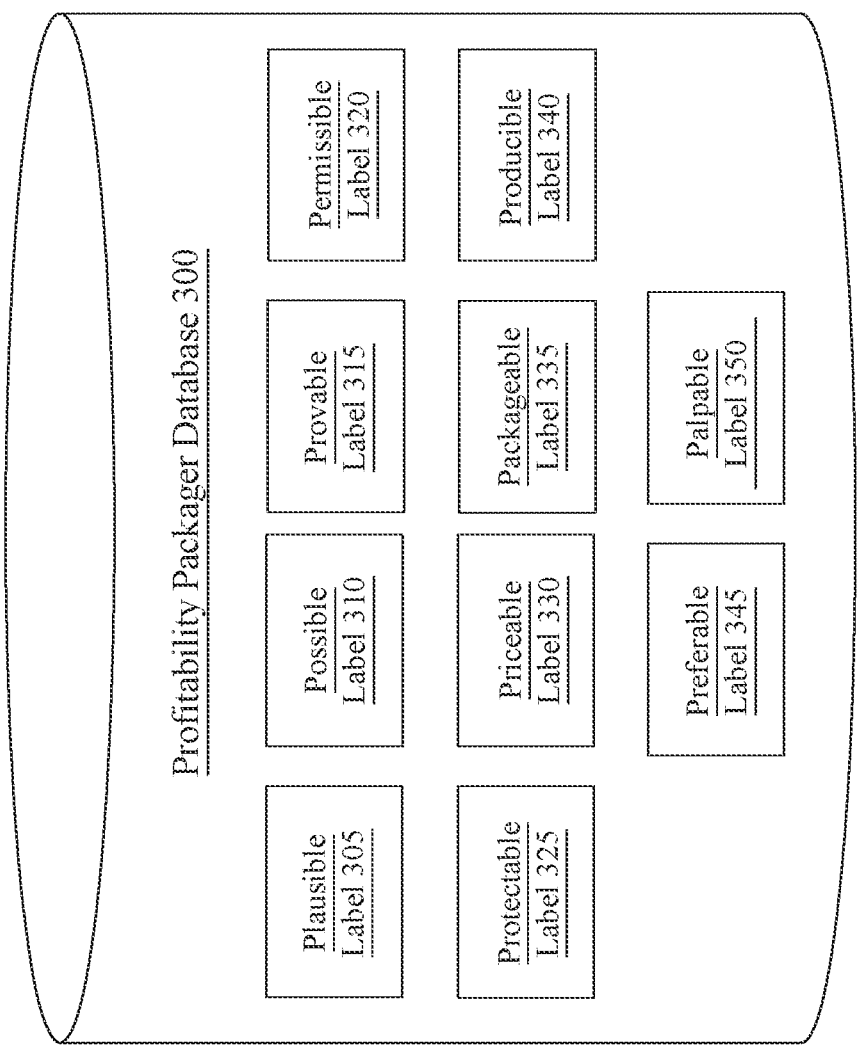
FIG. 3 is a diagrammatic representation of a profitability packager database.

Referring now to FIG. 3, an exemplary embodiment of profitability packager database 300 is illustrated. In one or more embodiments, profitability packager database 300 may be an example of database 150 of FIG. 1. database may, as a non-limiting example, organize data stored in the user activity database according to one or more database tables. One or more database tables may be linked to one another by, for instance, common column values. For instance, a common column between two tables of expert database may include an identifier of a submission, such as a form entry, textual submission, or the like, for instance as defined below; as a result, a may be able to retrieve all rows from any table pertaining to a given submission or set thereof. Other columns may include any other label usable for organization or subdivision of expert data, including types of data, identifiers of interface data structures relating to obtaining information from the user, times of submission, or the like. Persons skilled in the art, upon reviewing the entirety of this disclosure, will be aware of various ways in which user activity data from one or more tables may be linked and/or related to user activity data in one or more other tables.

In addition, in one or more embodiments, computing device 104 may be configured to access and retrieve one or more specific types of user attributes 154 and/or other data types, e.g., one or more instance of first datum 108, second datum 112, first operational value 116 and/or second operational value 118, as well as threshold datum 122, categorized in multiple tables from transfer objective database 300. For example, as shown in FIG. 3, profitability packager database 300 may be generated with multiple categories including the following, listed in order from least feasible to most feasible: plausible label 305; possible label 310; provable label 315; permissible label 320; protectable label 325; priceable label 330; packageable label 335; producible label 340; preferable label 345; and palpable label 350. Consequently, described processes may classify one or more instances of first datum 108 and second datum 112 and/or user-input datum 224A that may be input user input field 148 of FIG. 1. In some instances, user-input datum 224A may describe data for selecting a preferred attribute of any one or more skills associated with one or more instances of first operational value 116 and/or second operational value 118. In addition, described processes may retrieve data describing additional attributes related to the preferred attribute of first operational value 116 from profitability packager database 300 connected with the processor.

Figure 4:
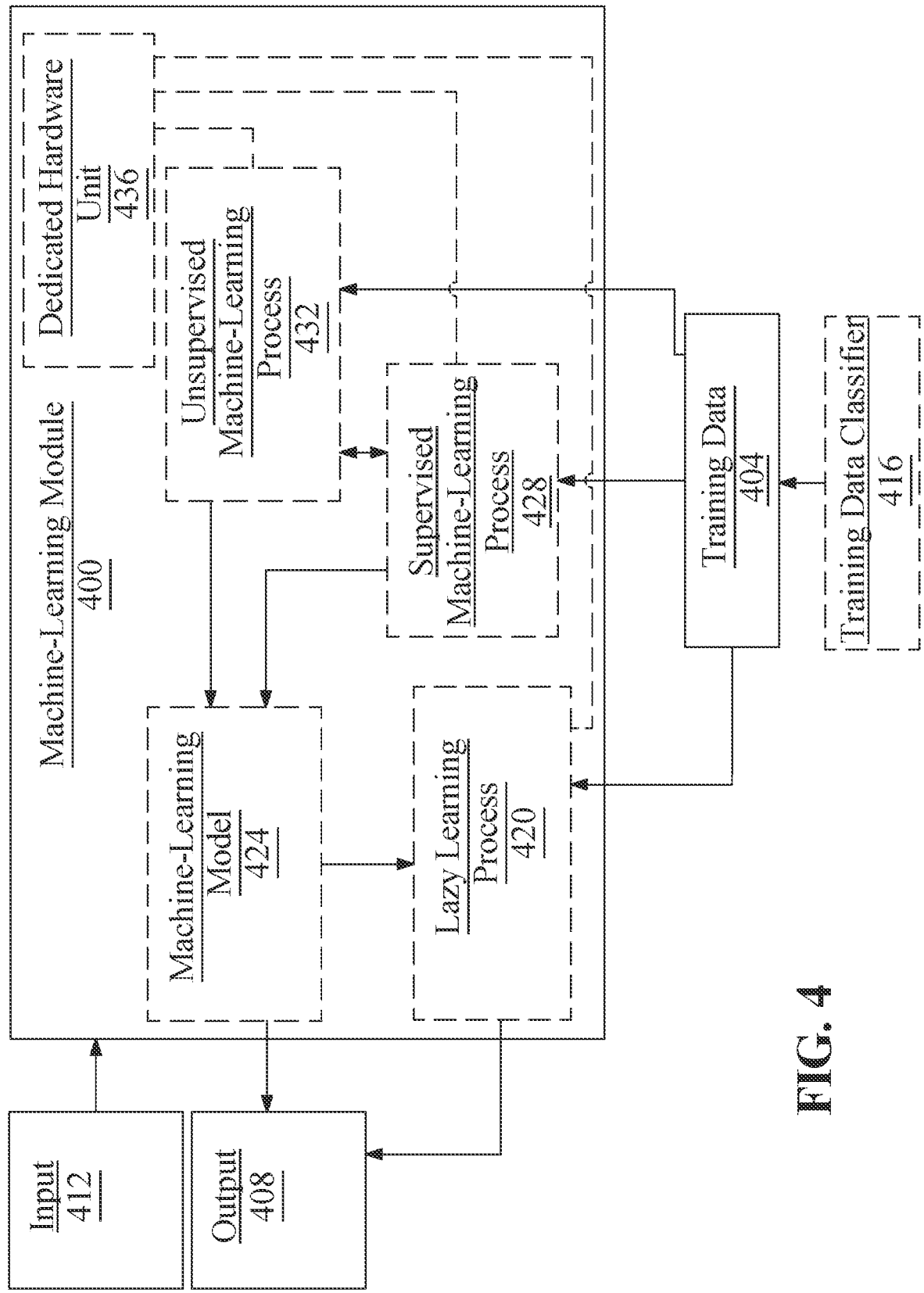
FIG. 4 is a block diagram of exemplary machine-learning processes.

Referring now to FIG. 4, an exemplary embodiment of a machine-learning module 400 that may perform one or more machine-learning processes as described in this disclosure is illustrated. In one or more embodiments, machine-learning module 400 may be an example of machine-learning module 120 of computing device 104 of FIG. 1. Machine-learning module 120 may perform determinations, classification, and/or analysis steps, methods, processes, or the like as described in this disclosure using machine-learning processes. A "machine-learning process," as used in this disclosure, is a process that automatedly uses training data 404 to generate an algorithm instantiated in hardware or software logic, data structures, and/or functions that will be performed by a computing device/module (e.g., computing device 104 of FIG. 1) to produce outputs 408 given data provided as inputs 412; this is in contrast to a non-machine-learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include multiple data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first label of data element may tend to correlate to a higher value of a second data element belonging to a second label of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in an order; such an n-gram may be categorized as an element of language such as a "word" to be tracked similarly to single words, generating a new label as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

As a non-limiting illustrative example, input data may include one or more instances of any one or more of first datum 108, second datum 112, first operational value 116, and/or second operational value 118, as well as label data 158 and/or user attributes 154, to provide the instruction set as may be determined as described earlier, such as where some instances of the first operational value 116 exceeding a threshold (e.g., that may be user-defined and input into user input field 148, or externally defined) are aggregated to define and display the instruction set to the user. In addition, in one or more embodiments, the interface data structure as described herein includes one or more interface data structures, any one of which may include an interface that defines a set of operations supported by a data structure and related semantics, or meaning, of those operations. For example, in the context of personal performance improvement coaching, interface data structure may include one or more interface data structures that may appear to the user in the form of one or more text-based or other digital media-based surveys, questionnaires, lists of questions, examinations, descriptions, etc.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to iteratively refine the instruction set to reflect the user's preferences, such as by preparing display model field 224B for the user to more effectively and/or efficiently progress to match second operational value 118.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes for providing a skill factor (e.g., of first operational value 116) hierarchy to a user. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include one or more instances of any one or more of first datum 108, second datum 112, first operational value 116, and/or second operational value 118, as well as label data 158 and/or user attributes 154 as described above as inputs, display model field 224B and/or similar textual and/or visual imagery (e.g., digital photos and/or videos) relating to providing display model field 224B to a user as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine-learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
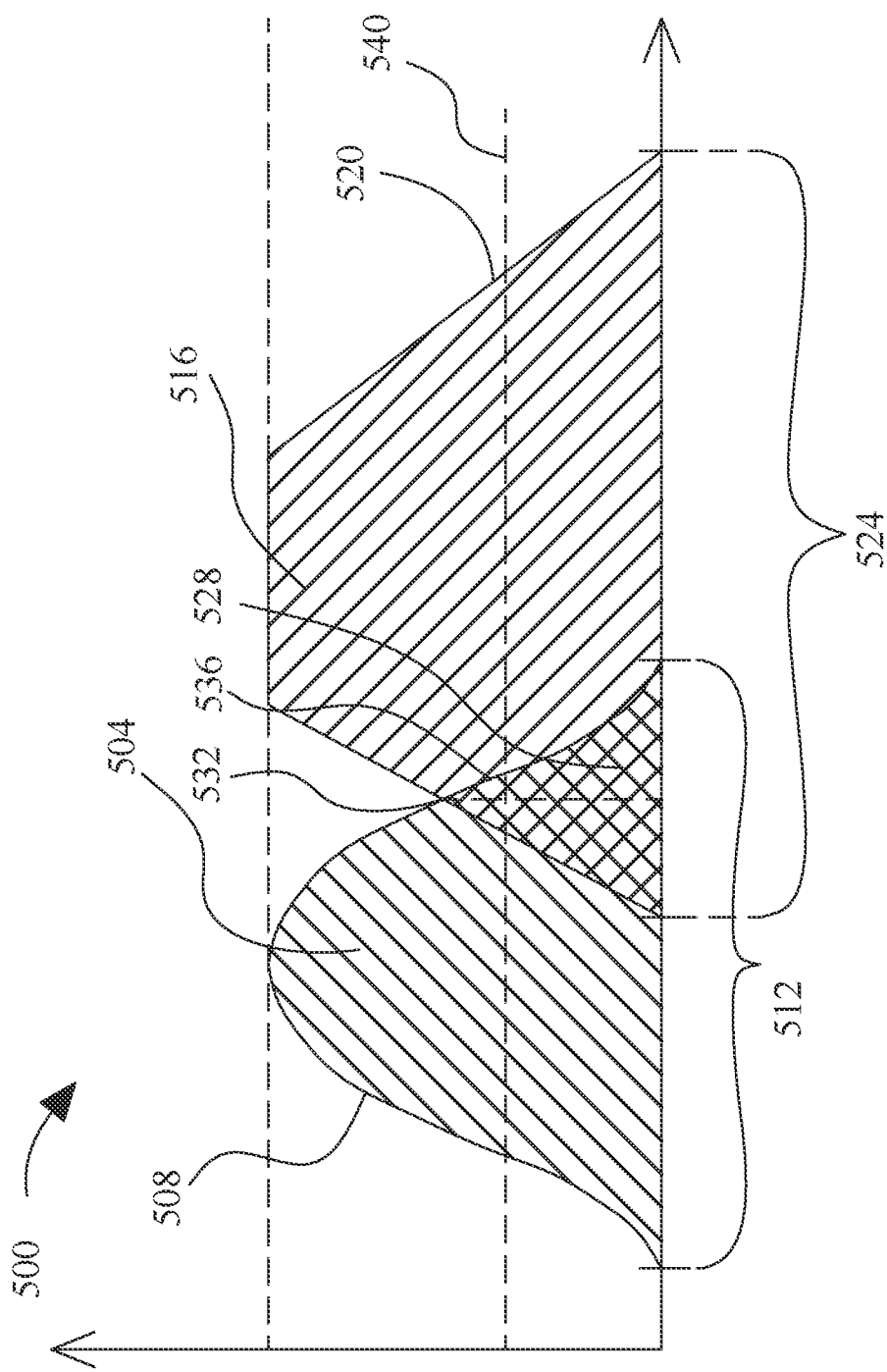
FIG. 5 is a graph illustrating an exemplary relationship between fuzzy sets.

Referring to FIG. 5, an exemplary embodiment of fuzzy set comparison 500 is illustrated. In one or more embodiments, data describing any described process relating to providing a skill factor hierarchy to a user as performed by processor 144 of computing device 104 may include data manipulation or processing including fuzzy set comparison 500. In addition, in one or more embodiments, usage of an inference engine relating to data manipulation may involve one or more aspects of fuzzy set comparison 500 as described herein. That is, although discrete integer values may be used as data to describe, for example, one or more instances of any one or more of first datum 108, second datum 112, first operational value 116, and/or second operational value 118, as well as label data 158 and/or user attributes 154, fuzzy set comparison 500 may be alternatively used. For example, a first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range of values 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, one or more instances of any one or more of first datum 108, second datum 112, first operational value 116, and/or second operational value 118, as well as label data 158 and/or user attributes 154, and a predetermined class, such as without limitation, data or information including interface data structures stored in profitability packager database 300 of FIG. 3. A second fuzzy set 516, which may represent any value which may be represented by first fuzzy set 504, may be defined by a second membership function 520 on a second range of values 524; second range of values 524 may be identical and/or overlap with first range of values 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range of values 512 and/or second range of values 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models one or more instances of any one or more of first datum 108, second datum 112, first operational value 116, and/or second operational value 118, as well as label data 158 and/or user attributes 154 and a predetermined class, such as without limitation, data categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify one or more instances of any one or more of first datum 108, second datum 112, first operational value 116, and/or second operational value 118, to as well as label data 158 and/or user attributes 154 stored in transfer objective database 300. For instance, if first datum 108 and/or interface data structure 112 has a fuzzy set matching certain interface data structure data values stored in profitability packager database 300 (e.g., by having a degree of overlap exceeding a threshold), computing device 104 may classify one or more instances of any one or more of first datum 108, second datum 112, first operational value 116, and/or second operational value 118 as belonging to user attributes 154 (e.g., aspects of user behavior as demonstrated by user attributes 154 of FIG. 1 and/or user group datum 308 of FIG. 3 relating to user commitment towards achieving second operational value 118). Where multiple fuzzy matches are performed, degrees of match for each respective fuzzy set may be computed and aggregated through, for instance, addition, averaging, or the like, to determine an overall degree of match.

Still referring to FIG. 5, in an embodiment, first datum 108 and/or second datum 112 may be compared to multiple profitability packager database 300 categorization fuzzy sets. For instance, first datum 108 and/or second datum 112 may be represented by a fuzzy set that is compared to each of the multiple profitability packager database 300 categorization fuzzy sets; and a degree of overlap exceeding a threshold between the first datum 108 and/or second datum 112 fuzzy set and any of the profitability packager database 300 categorization fuzzy sets may cause computing device 104 to classify one or more instances of any one or more of first datum 108, second datum 112, first operational value 116, and/or second operational value 118 as belonging to one or more corresponding interface data structures associated with profitability packager database 300 categorization (e.g., selection from categories in transfer objective database 300, etc.). For instance, in one embodiment there may be two profitability packager database 300 categorization fuzzy sets, representing, respectively, profitability packager database 300 categorization (e.g., into each of client group datum 304, user group datum 308, target transfer group 312, and/or work habit 316). For example, a First profitability packager database 300 categorization may have a first fuzzy set; a Second profitability packager database 300 categorization may have a second fuzzy set; and one or more instances of any one or more of first datum 108, second datum 112, first operational value 116, and/or second operational value 118, to as well as label data 158 and/or user attributes 154 may each have a corresponding fuzzy set.

Computing device 104, for example, may compare one or more instances of any one or more of first datum 108, second datum 112, first operational value 116, and/or second operational value 118, to as well as label data 158 and/or user attributes 154 fuzzy sets with fuzzy set data describing each of the categories included in transfer objective database 300, as described above, and classify one or more instances of any one or more of first datum 108, second datum 112, first operational value 116, and/or second operational value 118, to as well as label data 158 and/or user attributes 154 to one or more categories (e.g., client group datum 304, user group datum 308, target transfer group 312, and/or work habit 316). Machine-learning methods as described throughout may, in a non-limiting example, generate coefficients used in fuzzy set equations as described above, such as without limitation x, c, and σ of a Gaussian set as described above, as outputs of machine-learning methods. Likewise, any described datum herein may be used indirectly to determine a fuzzy set, as, for example, first datum 108 fuzzy set and/or second datum 112 fuzzy set may be derived from outputs of one or more machine-learning models that take first datum 108 and/or second datum 112 directly or indirectly as inputs.

Still referring to FIG. 5, a computing device may use a logic comparison program, such as, but not limited to, a fuzzy logic model to determine a profitability packager database 300 response. A profitability packager database 300 response may include, but is not limited to, accessing and/or otherwise communicating with any one or more of client group datum 304, user group datum 308, target transfer group 312, work habit 316, and the like; each such profitability packager database 300 response may be represented as a value for a linguistic variable representing profitability packager database 300 response or in other words a fuzzy set as described above that corresponds to a degree of matching between data describing first datum 108 and/or second datum 112 and one or more categories within profitability packager database 300 as calculated using any statistical, machine-learning, or other method that may occur to a person skilled in the art upon reviewing the entirety of this disclosure.

In some embodiments, determining a profitability packager database 300 categorization may include using a linear regression model. A linear regression model may include a machine-learning model. A linear regression model may be configured to map data of first datum 108 and/or second datum 112, to one or more profitability packager database 300 parameters. A linear regression model may be trained using a machine-learning process. A linear regression model may map statistics such as, but not limited to, quality of first datum 108 and/or second datum 112. In some embodiments, determining profitability packager database 300 of first datum 108 and/or second datum 112 may include using a profitability packager database 300 classification model. A profitability packager database 300 classification model may be configured to input collected data and cluster data to a centroid based on, but not limited to, frequency of appearance, linguistic indicators of quality, and the like. Centroids may include scores assigned to them such that quality of first datum 108 and/or second datum 112 may each be assigned a score.

In some embodiments, profitability packager database 300 classification model may include a K-means clustering model. In some embodiments, profitability packager database 300 classification model may include a particle swarm optimization model. In some embodiments, determining the profitability packager database 300 of first datum 108 and/or second datum 112 may include using a fuzzy inference engine (e.g., to assess the progress of the user and use said data to amend or generate new strategies based on user progress). A fuzzy inference engine may be configured to map one or more instances of any one or more of first datum 108, second datum 112, first operational value 116, and/or second operational value 118, to as well as label data 158 and/or user attributes 154 data elements using fuzzy logic. In some embodiments, described datum may be arranged by a logic comparison program into profitability packager database 300 arrangement. A "profitability packager database 300 arrangement" as used in this disclosure is any grouping of objects and/or data based on similarity to each other and/or relation to providing display model field 224B of FIG. 2B to the user for the user to achieve. This step may be implemented as described above in FIG. 1.

Membership function coefficients and/or constants as described above may be tuned according to classification and/or clustering algorithms. For instance, and without limitation, a clustering algorithm may determine a Gaussian or other distribution of questions about a centroid corresponding to a given scoring level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented to assess the progress of the user and use said data to amend or generate new strategies based on user progress according to input and/or output membership functions and/or linguistic variables. For instance, a first linguistic variable may represent a first measurable value pertaining to first datum 108 and/or second datum 112, such as a degree of matching between data describing user aspirations and strategies based on responses to interface data structures stored in transfer objective database 300. Continuing the example, an output linguistic variable may represent, without limitation, a score value. An inference engine may combine rules, such as: "if the demonstrated commitment level of a person or business falls beneath a threshold," and "the observed performance of the person or business relative to their or its peers is deficient," the commitment score is 'deficient'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
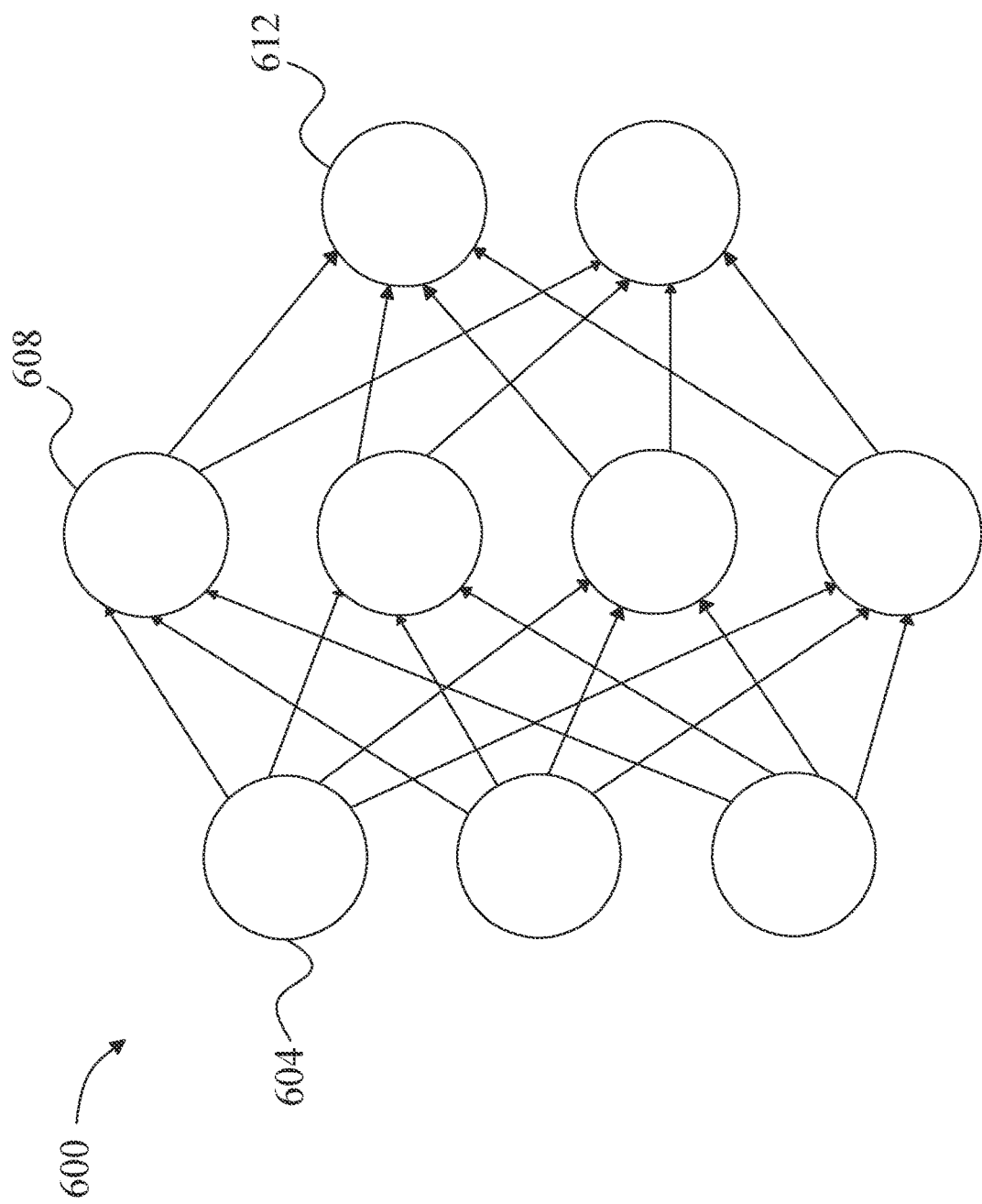
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
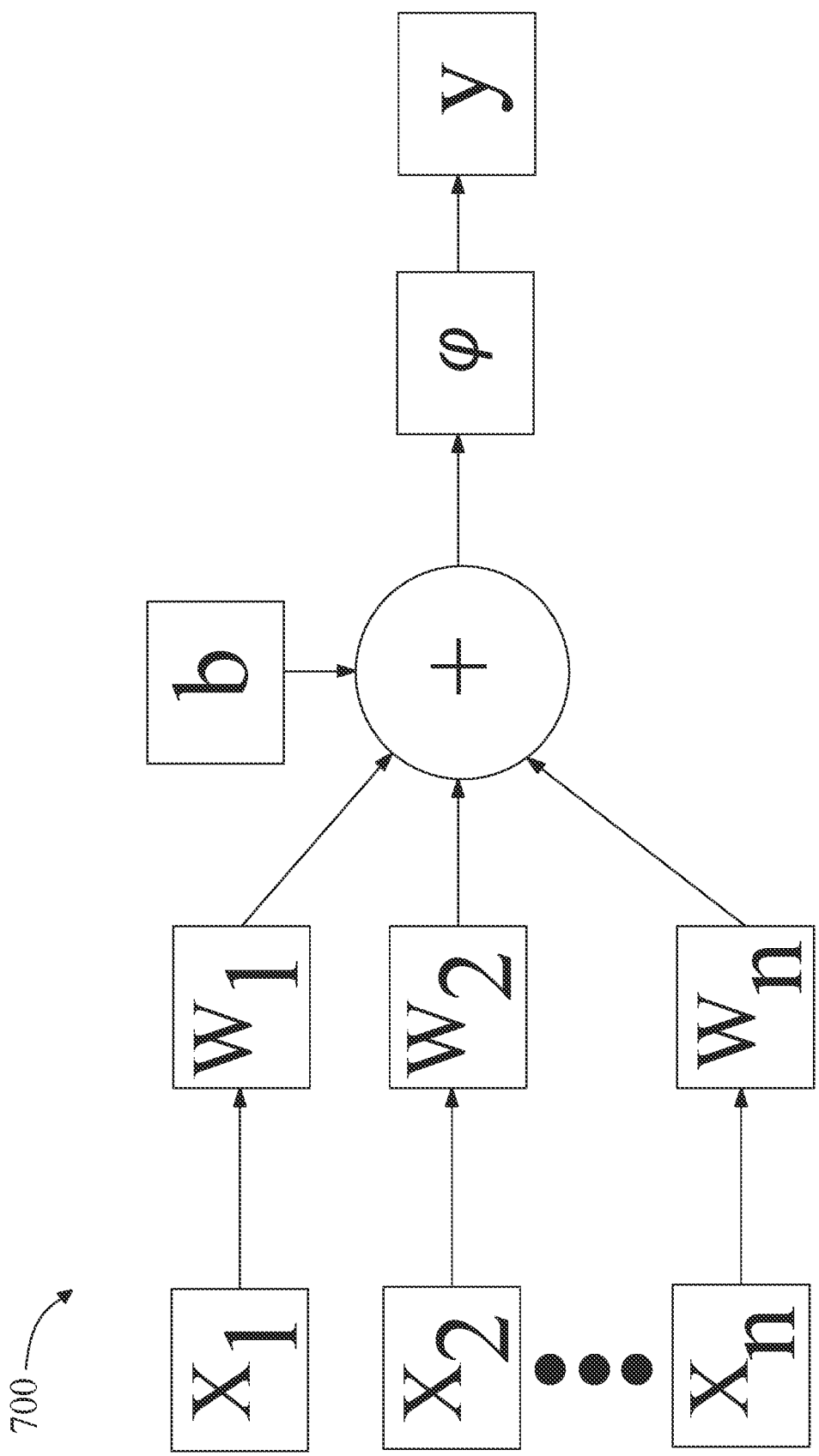
FIG. 7 is a diagram of an illustrative embodiment of a node of a neural network.
Figure 8:
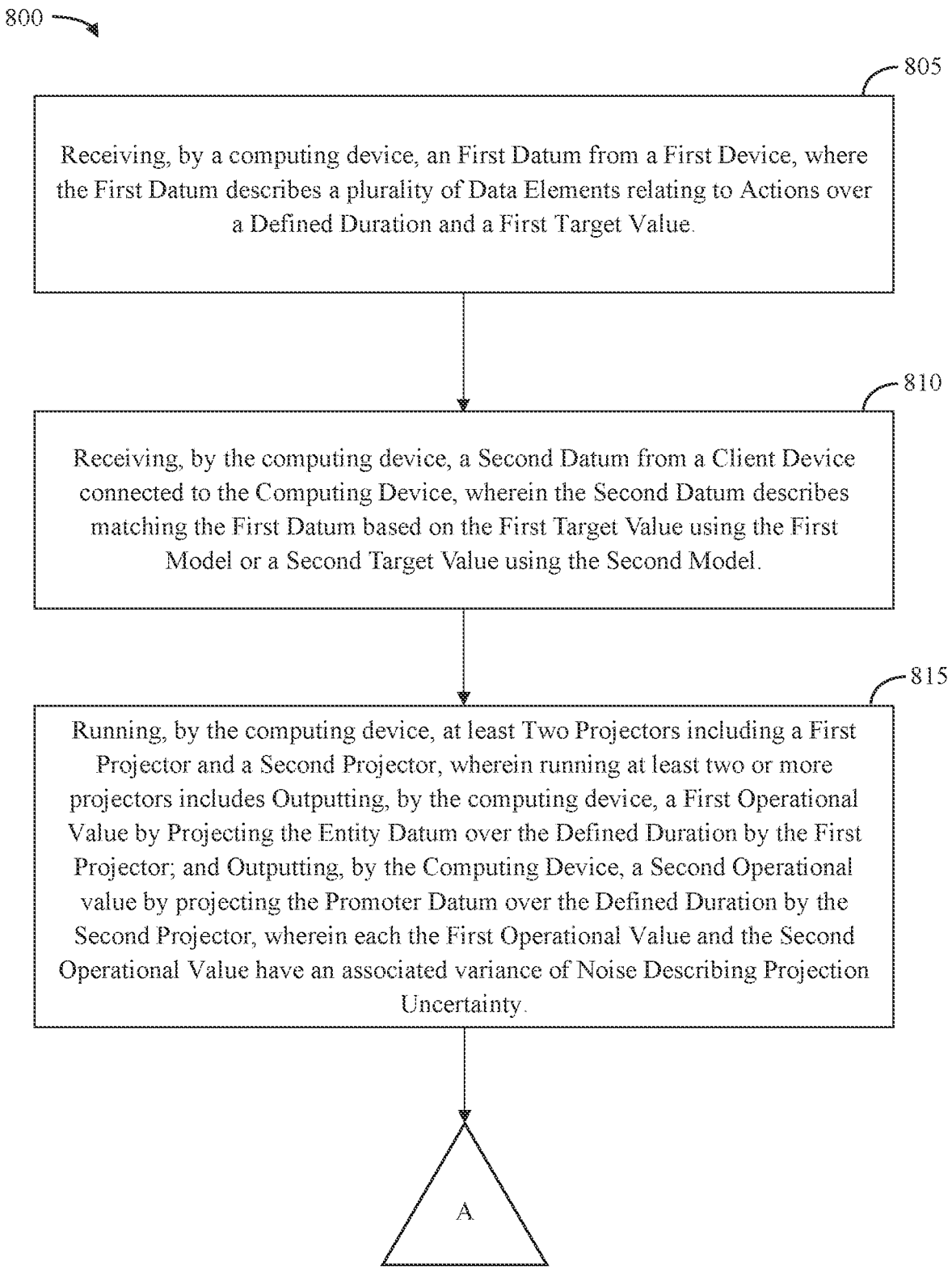
FIG. 8 is a flow diagram of an exemplary method for model selection between a first model and a second model using projector inferencing.
Figure 8:
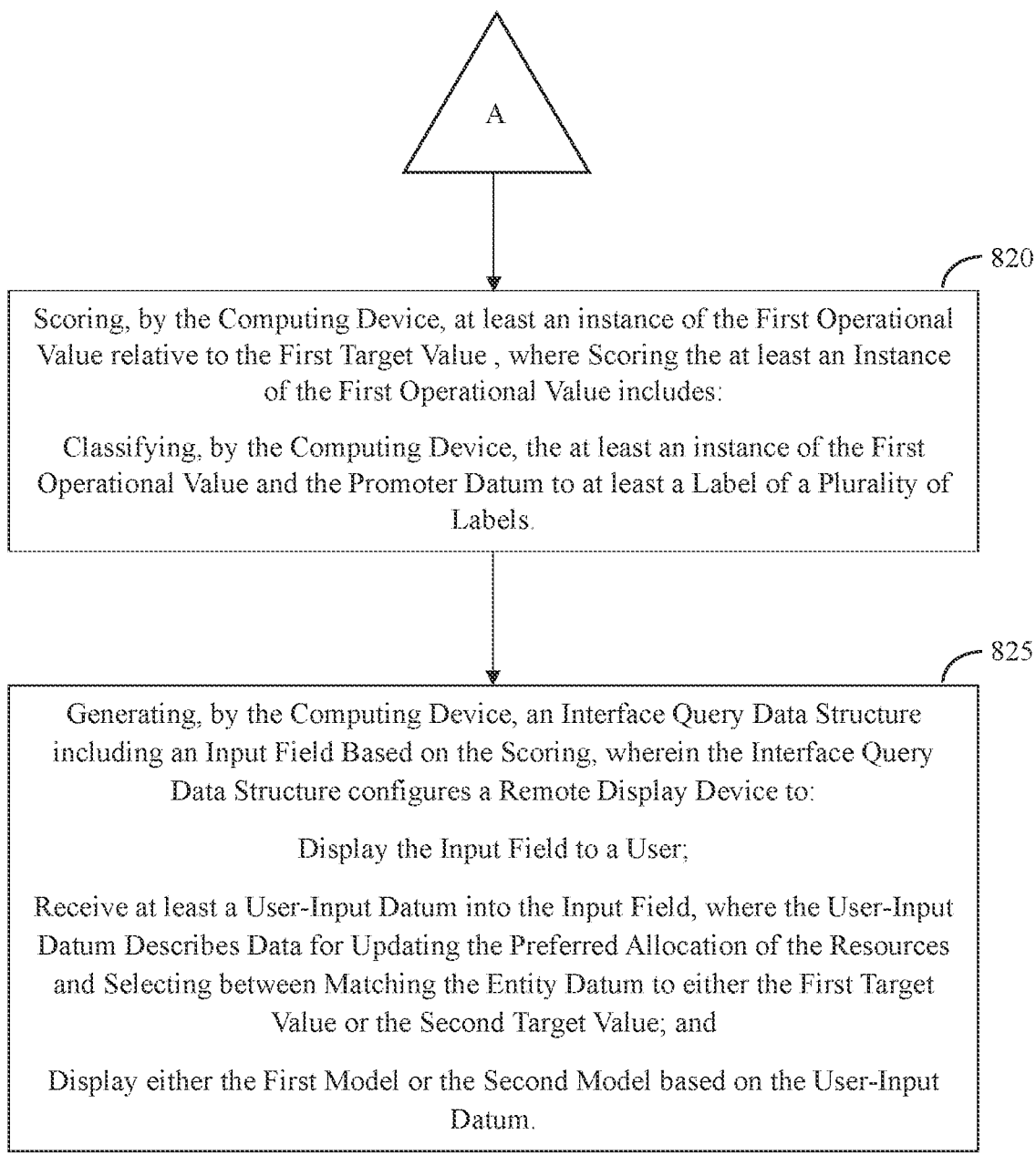

Referring now to FIG. 7, an exemplary embodiment of a node 700 of a neural network is illustrated. A node may include, without limitation, a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs x, that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Now referring to FIG. 6, method 600 for model selection between a first model and a second model using projector inferencing is described. At step 605, method 600 includes receiving, by a computing device, an entity datum from an entity device, where the entity datum describes a plurality of data elements relating to actions over a defined duration and a target value (e.g., a set of choices relating to a selection of a preferred allocation between a more-preferred allocation and a less-preferred allocation of the plurality of data elements). This step may be implemented as described above, without limitation, in FIGS. 1-7.

Still referring to FIG. 6, at step 610, method 600 includes receiving, by the computing device, a second datum from a client device connected to the computing device, wherein the second datum describes matching the entity datum with a first target value using the first model or a second target value using the second model. This step may be implemented as described above, without limitation, in FIGS. 1-7.

Still referring to FIG. 6, at step 615, method 600 includes running, by the computing device, two projectors including a first projector and a second projector, wherein running two or more projectors includes outputting, by the computing device, a first operational value by projecting the entity datum over the defined duration by the first projector; and outputting, by the computing device, a second operational value by projecting the second datum over the defined duration by the second projector, wherein each the first operational value and the second operational value have an associated variance of noise describing projection uncertainty. This step may be implemented as described above, without limitation, in FIGS. 1-7.

Still referring to FIG. 6, at step 620, method 600 includes scoring, by the computing device, an instance of the first operational value relative to the first target value. In some embodiments, scoring includes using a fuzzy inferencing system to impose rules that account for projections output by the two or more projectors, wherein scoring the an instance of the first operational value includes classifying, by the computing device, the an instance of the first operational value and the second datum to a plurality of categories organized sequentially in multiple discrete increments defined based on a proximity of a respective label to the first target value. In some instances, scoring may include directing, by the computing device, a fraction of the plurality of data elements to the entity device based on a preferred allocation and classification, wherein the fraction is constrained to exceeding a pre-defined threshold value resulting in over-depletion of data elements from the less-preferred allocation. This step may be implemented as described above, without limitation, in FIGS. 1-7.

Still referring to FIG. 6, at step 625, method 600 includes generating, by the computing device, an interface data structure including an input field based on ranking the an instance of the entity datum based on classification, wherein the interface data structure configures a remote display device to display the input field to a user; receive a user-input datum into the input field, wherein the user-input datum describes data for updating the preferred allocation of the plurality of data elements and selecting between matching the entity datum to either the first target value or the second target value; and display either the first model or the second model based on the user-input datum. This step may be implemented as described above, without limitation, in FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
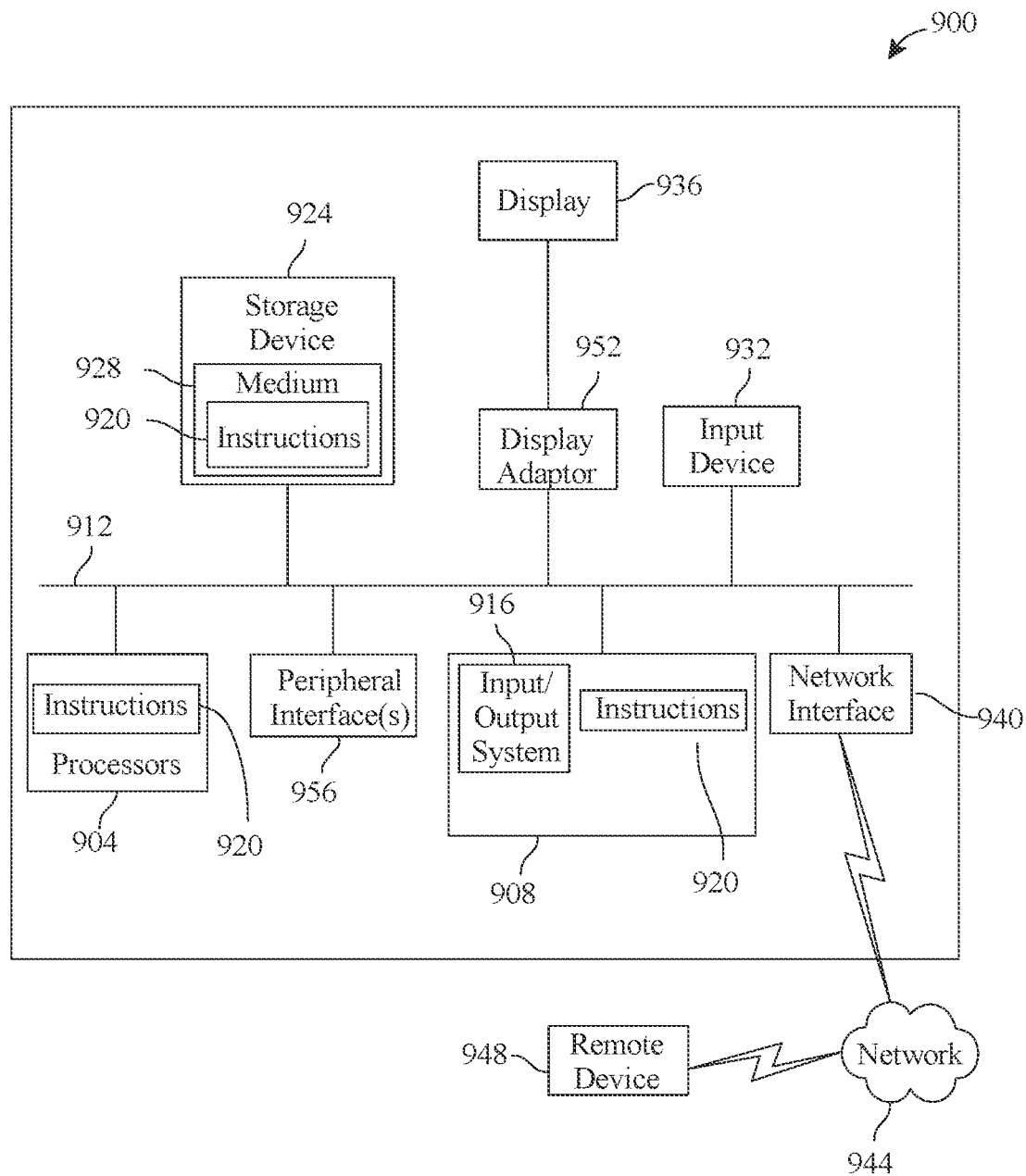
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes several separate embodiments, what has been described herein is merely illustrative of the application of the principles of the present invention. Additionally, although methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for model selection between a first model and a second model using projector inferencing, the apparatus comprising:
    a processor;
    a memory connected to the processor, the memory containing instructions configuring the processor to:
        receive a first datum from a first device, wherein:
            the first datum describes a plurality of data elements relating to actions over a defined duration and a first target value;
        receive a second datum from a client device connected to the processor, wherein the second datum describes matching the first datum based on the first target value using the first model or a second target value using the second model;
        run two projectors including a first projector and a second projector, wherein running two or more projectors further comprises:
            outputting a first operational value by projecting the first datum over the defined duration by the first projector; and
            outputting a second operational value by projecting the second datum over the defined duration by the second projector, wherein each the first operational value and the second operational value have an associated variance of noise describing projection uncertainty;
        score an instance of the first operational value relative to the first target value, wherein scoring the instance of the first operational value further comprises:

classifying the instance of the first operational value and the second datum to a label of a plurality of labels; and scoring the instance of the first operational value as a function of the classification;

generate an interface data structure including an input field based on the scoring, wherein the interface data structure configures a remote display device to:

display the input field to a user;

receive a user-input datum into the input field, wherein the user-input datum describes data for updating the plurality of data elements and selecting between matching the first datum to either the first target value or the second target value; and display either the first model or the second model based on the user-input datum.

2. The apparatus of claim 1, wherein using projector inferencing further comprises:

retrieving data describing attributes of the user from a database communicatively connected to the processor; and generating the interface data structure based on the data describing attributes of the user.

3. The apparatus of claim 1, wherein using projector inferencing further comprises:

retrieving data describing current preferences of the client device between a minimum value and a maximum value from a database communicatively connected to the processor; and generating the interface data structure based on the data describing current preferences of the client device.

4. The apparatus of claim 1, wherein using projector inferencing further comprises:

classifying at the instance of the first datum and the second datum to the first target value;

ranking at the instance of the first datum and the second datum based on a respective proximity to the first target value; and adjusting a threshold datum for triggering resource transfer from the client device to the first device based on the ranking of an instance of the first datum and the second datum.

5. The apparatus of claim 1, wherein the first datum describes data elements of the first device and a pattern that is representative of entity interactions with the user, and wherein using projector inferencing further comprises:

determining a threshold datum by classifying the pattern that is representative of entity interaction with the user to the second datum.

6. The apparatus of claim 5, wherein using projector inferencing comprises:

adjusting the pattern that is representative of entity interaction with the user based on the threshold datum.

7. The apparatus of claim 6, wherein using projector inferencing further comprises:

classifying the first datum to one or more of the plurality of labels based on the pattern that is representative of entity interaction with the user.

8. The apparatus of claim 1, further configured to evaluate the user-input datum comprising:

classifying one or more new instances of the user-input datum to the first datum and the second datum;

generating a gap datum based on the classification by subtracting a respective entity datum from the first target value; and displaying one or more instances of the gap datum in an ordered data structure.

9. The apparatus of claim 1, wherein classifying the instance of the first datum and the second datum to a plurality of categories further comprises:

aggregating the first datum based on the classification; and further classifying aggregated entity data to data describing a pattern that is representative of entity interaction with the user.

10. The apparatus of claim 1, wherein the interface data structure further configures the remote display device to provide an articulated graphical display including multiple regions organized in a tree structure format, wherein each region provides one or more instances of point of interaction between the user and the remote display device.

11. A method for model selection between a first model and a second model using projector inferencing, the method comprising:

receiving, by a computing device, a first entity datum from a first device, wherein:

the first datum describes a plurality of data elements relating to actions over a defined duration and a first target value;

receiving, by the computing device, a second datum from a client device connected to the computing device, wherein the second datum describes matching the first datum based on the first target value using the first model or a second target value using the second model;

running, by the computing device, a plurality of projectors including a first projector and a second projector, wherein running the plurality of projectors further comprises:

outputting, by the computing device, a first operational value by projecting the entity datum over the defined duration by the first projector; and outputting, by the computing device, a second operational value by projecting the second datum over the defined duration by the second projector, wherein each the first operational value and the second operational value have an associated variance of noise describing projection uncertainty;

scoring, by the computing device, an instance of the first operational value relative to the first target value, wherein scoring the instance of the first operational value further comprises:

classifying, by the computing device, the instance of the first operational value and the second datum to a label of a plurality of labels; and scoring the instance of the first operational value relative to the first target value as a function of the label;

generating, by the computing device, an interface data structure including an input field based on the scoring, wherein the interface data structure configures a remote display device to:

display the input field to a user;

receive a user-input datum into the input field, wherein the user-input datum describes data for updating the plurality of data elements and selecting between matching the first datum to either the first target value or the second target value; and display either the first model or the second model based on the user-input datum.

12. The method of claim 11, wherein generating the interface data structure further comprises:

retrieving data describing attributes of the user from a database communicatively connected to the computing device; and generating the interface data structure based on the data describing attributes of the user.

13. The method of claim 11, further comprising:
retrieving data describing current preferences of the client device between a minimum value and a maximum value from a database communicatively connected to the computing device; and
generating the interface data structure based on the data describing current preferences of the client device.

14. The method of claim 11, further comprising:
classifying at the instance of the entity datum and the second datum to the first target value;
ranking at the instance of the entity datum and the second datum based on a respective proximity to the first target value; and
adjusting a threshold datum for triggering resource transfer from the client device to the entity device based on the ranking of an instance of the entity datum and the second datum.

15. The method of claim 11, wherein the entity datum describes data elements of the entity device and a pattern that is representative of entity interactions with the user, and further comprising:
determining a threshold datum by classifying the pattern that is representative of entity interaction with the user to the second datum.

16. The method of claim 15, further comprising:
adjusting the pattern that is representative of entity interaction with the user based on the threshold datum.

17. The method of claim 16, further comprising:
classifying the entity datum to one or more of the plurality of labels based on the pattern that is representative of entity interaction with the user.

18. The method of claim 11, further comprising:
classifying one or more new instances of the user-input datum to the entity datum and the second datum;
generating a gap datum based on the classification by subtracting a respective entity datum from the first target value; and
displaying one or more instances of the gap datum in an ordered data structure.

19. The method of claim 11, further comprising:
aggregating the entity datum based on classification; and
further classifying aggregated entity data to data describing a pattern that is representative of entity interaction with the user.

20. The method of claim 11, wherein the interface data structure further configures the remote display device to provide an articulated graphical display including multiple regions organized in a tree structure format, wherein each region provides one or more instances of point of interaction between the user and the remote display device.

* * * * *